(12) United States Patent
Fang et al.

(10) Patent No.: US 8,711,673 B1
(45) Date of Patent: *Apr. 29, 2014

(54) MODE DETECTION FOR DVB RECEIVER

(75) Inventors: Jing Fang, San Jose, CA (US);
Runsheng He, Sunnyvale, CA (US);
Zhipei Chi, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,399

(22) Filed: May 23, 2011

Related U.S. Application Data

(63) Continuation of application No. 11/894,864, filed on Aug. 21, 2007.

(60) Provisional application No. 60/823,215, filed on Aug. 22, 2006.

(51) Int. Cl.
*H04J 11/00* (2006.01)

(52) U.S. Cl.
USPC .......................................................... 370/208

(58) Field of Classification Search
None
See application file for complete search history.

(56) References Cited

U.S. PATENT DOCUMENTS

| | | | |
|---|---|---|---|
| 5,818,813 A | 10/1998 | Saito et al. | |
| 6,628,730 B1 * | 9/2003 | Stott et al. | 375/344 |
| 6,992,972 B2 | 1/2006 | Van Nee | |
| 7,319,659 B2 | 1/2008 | Tsuie | |
| 7,433,296 B2 | 10/2008 | Tsuie | |
| 7,505,420 B2 * | 3/2009 | Do et al. | 370/252 |
| 7,555,072 B2 * | 6/2009 | Kim | 375/343 |
| 7,577,216 B2 * | 8/2009 | Zhang | 375/343 |
| 7,957,259 B1 * | 6/2011 | Fang et al. | 370/208 |
| 2002/0186791 A1 * | 12/2002 | Foxcroft et al. | 375/324 |
| 2003/0090994 A1 * | 5/2003 | Kakura | 370/208 |
| 2004/0066802 A1 | 4/2004 | Ro et al. | |
| 2004/0095990 A1 * | 5/2004 | Gossett et al. | 375/148 |
| 2004/0223449 A1 * | 11/2004 | Tsuie et al. | 370/204 |
| 2005/0100118 A1 | 5/2005 | Zhang | |
| 2006/0146947 A1 | 7/2006 | Kim | |
| 2006/0239179 A1 * | 10/2006 | Berkeman et al. | 370/208 |
| 2007/0058758 A1 * | 3/2007 | Ishii | 375/343 |
| 2007/0086329 A1 * | 4/2007 | Glazko et al. | 370/208 |
| 2012/0294296 A1 * | 11/2012 | Lee et al. | 370/338 |

OTHER PUBLICATIONS

Zou, Li, "Automatic Detection of the Guard Interval Length in OFDM System," Journal of Communications, vol. 1, No. 6, Sep. 2006.

* cited by examiner

*Primary Examiner* — Anh-vu Ly

(57) ABSTRACT

Systems, apparatus and methods are provided for detecting the mode of a received OFDM signal. A received signal may be correlated with one or more time-delayed version of itself resulting in a set of correlation signals. Each correlation signal may be analyzed for one or more characteristics that can be used to determine the symbol length of the received signal. In order to minimize the number of correlations performed, one or more correlations can be used with varying symbol lengths and a fixed guard interval length. The correlation signals can be processed by filters, and the characteristics of the filtered correlation signals can be analyzed to determine the guard interval length of the received signal. In addition to detecting symbol length, the present invention can be used to detect receiver impairment and perform any appropriate compensations.

21 Claims, 15 Drawing Sheets

MODE DETECTION FOR DVB RECEIVER

This application is a continuation of Ser. No. 11/894,864, filed on Aug. 21, 2007, which claims the benefit of U.S. Provisional Application No. 60/823,215 filed Aug. 22, 2006, the disclosure of which is incorporated herein by reference in its entirety.

BACKGROUND OF THE INVENTION

This invention relates to the field of orthogonal frequency-division multiplexing (OFDM) and, more particularly, to mode detection of OFDM signals.

In OFDM systems such as digital video broadcast (DVB) systems, each symbol has a predetermined length and is transmitted as part of a transmission block. In order to counteract multi-path distortions (reflected signals that are received after the primary signal is received), most systems incorporate a redundant portion into each transmission block. This redundant portion is generally known as a guard interval and is usually expressed as a fraction of the symbol length.

Some OFDM receivers are capable of receiving different types of OFDM signals. In order to properly demodulate a received signal, such a device must be able to identify what mode (symbol length and guard interval size) was used to generate the signal. For example, if a device is designed to receive OFDM signals with a symbol length of 2048, 4096 or 8192 samples and a guard interval that is $1/4$, $1/8$, $1/16$ or $1/32$ of each symbol length, there are 12 different combinations of parameters (or modes) that the device must be able to recognize. Traditionally, OFDM receivers perform a different correlation for each mode, and the correlation having the maximum peak amplitude will be used to identify the appropriate mode. However, this approach is computationally intensive and may sometimes fail to identify the correct mode.

Further limitations and disadvantages of conventional and traditional approaches will become apparent to one of ordinary skill in the art, through comparison of such systems with some aspects of the present invention as set forth in the remainder of the present application with reference to the drawings.

SUMMARY OF THE INVENTION

In accordance with the principles of the present invention, systems, apparatus and methods are provided for computationally efficient detection of the mode of a received OFDM signal.

A received signal may be correlated with one or more delayed versions of itself resulting in a set of correlation signals. The amount of delay and the summation interval of each correlation operation may correspond to a possible symbol length, adjustment length (e.g., to compensate for receiver impairment), and/or guard interval size. Each correlation signal may be evaluated-based on one or more characteristics that may be used to determine the strongest correlation and, therefore, the most likely symbol length and guard interval size of the received signal.

In order to minimize the number of correlations performed, one or more preliminary correlations may be performed to test for varying symbol lengths and a fixed guard interval size. The characteristics of these preliminary correlation signals may be analyzed to determine the symbol length of the received signal. The preliminary correlation signals may be processed by filters that may be dependant on the determined symbol length. The characteristics of the filtered correlation signals may be analyzed to determine the guard interval size of the received signal.

The preliminary correlation may also be down-sampled before filtering. The down-sampling may be at a rate that is predetermined (e.g., based on one or more hardware requirements) or a rate that varies according to the determined symbol length. If the down-sampling rate is dependent upon the determined symbol length, it may not be necessary for the subsequent filters to reconfigure themselves based on the determined symbol length.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
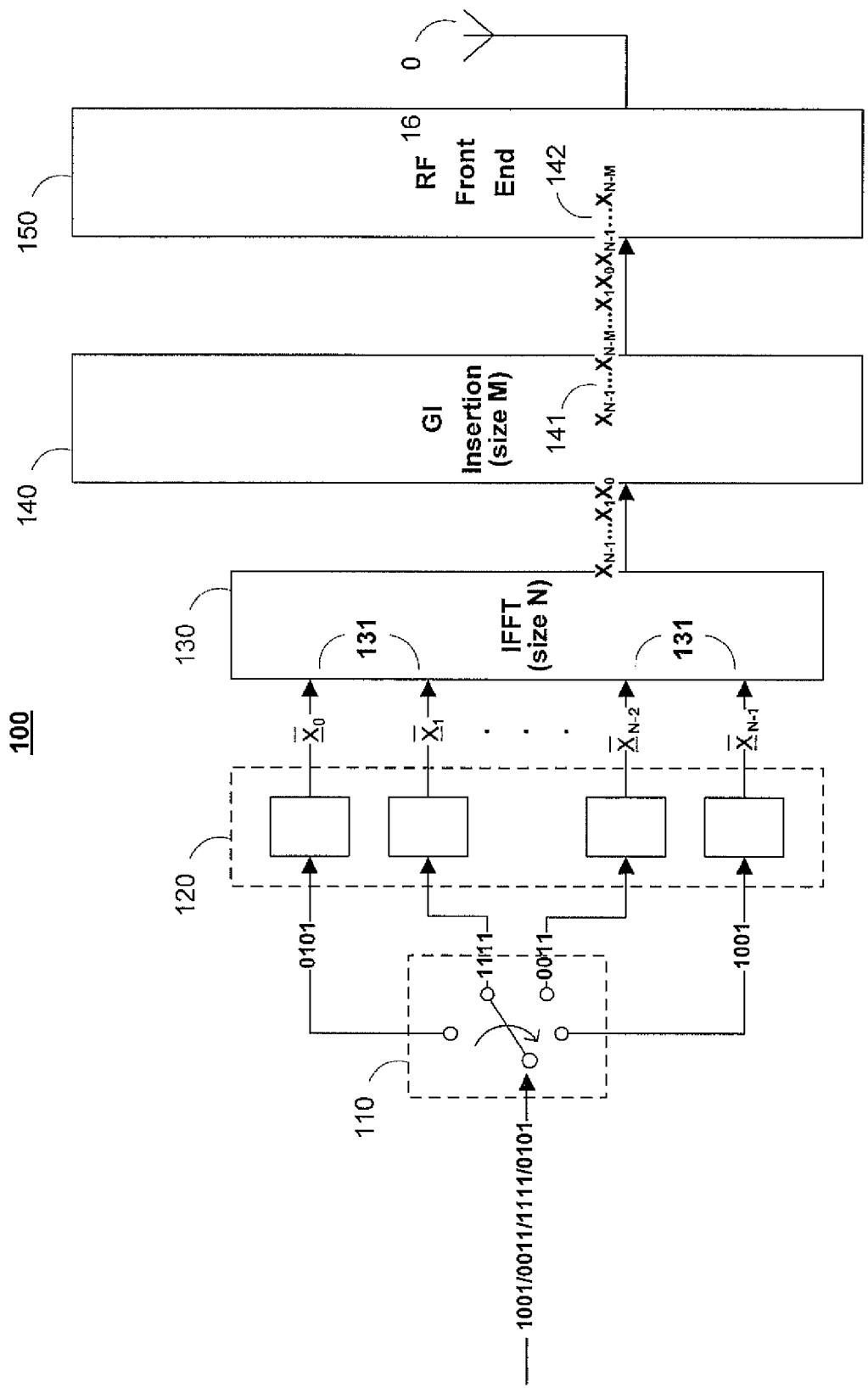
FIG. 1 is a simplified block diagram of a conventional OFDM transmitter.

In order to generate OFDM signals, sequential bits of binary data are converted to temporal signals for transmission. FIG. 1 shows a typical OFDM transmitter 100. Transmitter 100 may include at least serial-to-parallel circuitry 110, binary conversion circuitry 120, IFFT circuitry 130, guard interval (GI) insertion circuitry 140, RF front end circuitry 150 and an antenna 160. Serial-to-parallel circuitry 110 can convert serial bits of a predetermined size to parallel data lines. Binary conversion circuitry 120 can map combinations of binary bits onto a sub carrier frequency for transmission. Each frequency may be coupled with an input of IFFT circuitry 130. IFFT circuitry 130 may have N inputs 131 and can calculate the Inverse Discrete Fourier Transform of the N frequencies in order to produce an output sequence (or symbol) of N samples. In some embodiments, data may not be assigned to every input of IFFT circuitry 130 (i.e., only select carrier frequencies may be used).

The outputs of IFFT circuitry 130 may be coupled with guard interval insertion circuitry 140 which may use portion 141 of samples from the end of the sequence to insert portion 142 at the beginning of the sequence. The size of the added portion may be defined as a fraction, referred to as the guard interval size ($M_r$), of the original symbol length N. For example, in the case where the are eight samples in a symbol (N=8) and the guard interval is a quarter of the symbol length ($M_r=¼$), the last two samples of the symbol will be copied and inserted before the symbol as a guard interval. Guard intervals and their purpose are discussed in more detail below and in connection with FIG. 2.

After the guard interval is added, the lengthened transmission block can be processed by RF front end circuitry 150. Front end circuitry 150 can convert the sequence to a signal acceptable for transmission. Front end circuitry 150 can broadcast the converted signal through antenna 160.

There are interference issues which may affect wirelessly transmitted data. For example, wireless signals might reflect off of objects (e.g., large buildings) and arrive at a receiver after the primary signal. These delayed signals, called multipath distortions, can interfere with subsequent signals causing transmission errors. In order to prevent multipath distortions, many OFDM systems transmit a guard interval. Typically represented as a fraction of the symbol length, a guard interval is a copy of a portion of the symbol. In order to create guard intervals, most systems copy a portion from the end of a symbol and attach it to the beginning of the symbol. This redundant portion in the beginning of each symbol is designed to prevent any late-arriving reflections of previous symbols and early-arriving reflections of next symbols from interfering with the data in the current symbol.

Figure 2:
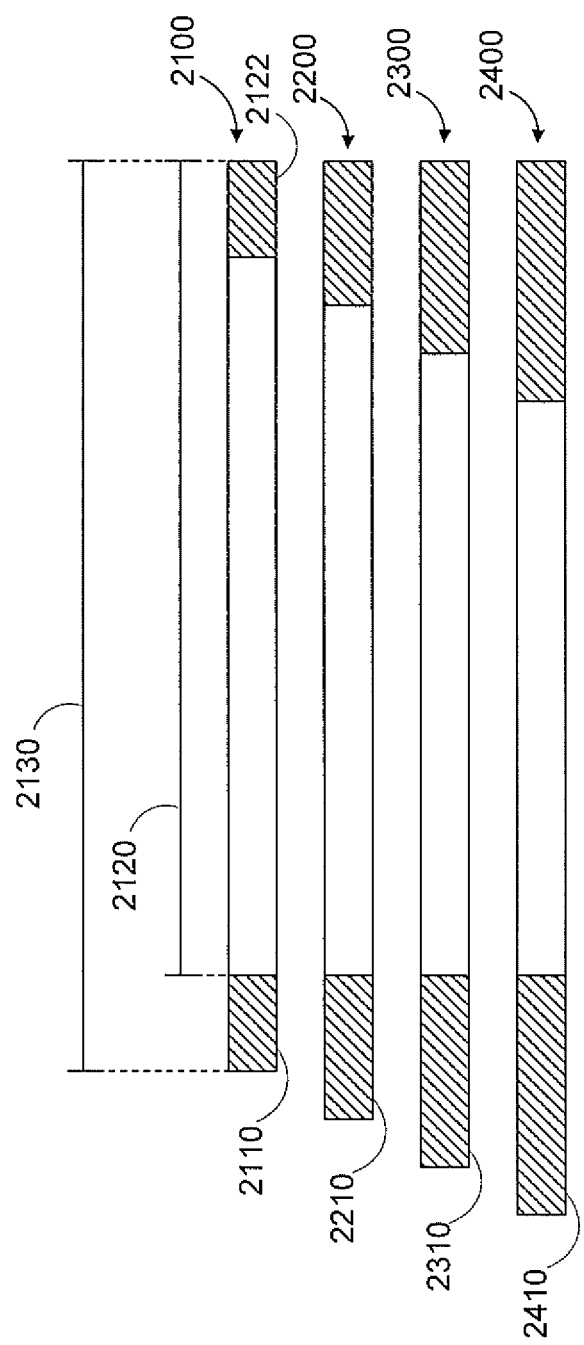
FIG. 2 is a simplified timing diagram of conventional OFDM signals with different guard intervals.

FIG. 2 shows multiple OFDM signals with guard intervals of different sizes. For example, signal 2100 includes a guard interval 2110 that is 1/32 ($M_r=1/32$) the size of symbol length 2120. Signal 2100 may therefore require a total transmission block length 2130 which may be 33/32 the size of symbol length 2120. The waveform transmitted during guard interval 2110 may be the same as the waveform 2122 transmitted at the end of the symbol. Signals 2200, 2300 and 2400 each include guard intervals that are different fractions of symbol length 2120. In particular, signals 2200, 2300 and 2400 may include respective guard intervals 2210, 2310 and 2410 which may each be 1/16, 1/8 and 1/4 of symbol length 2120. It is understood that while the guard intervals shown in FIG. 2, as well as those in the systems and methods discussed below are described as having a size that is ¼, ⅛, 1/16 and 1/32 of their associated symbols, guard intervals of different sizes can be used without deviating from the spirit of the present invention.

While the term guard interval size ($M_r$) is used to reference a fraction of symbol length (e.g., ¼, ⅛, 1/16, 1/32, etc.), the term guard interval length (M) can be used herein to identify the actual length of a guard interval. For example, if a symbol length is 1024 samples, a guard interval size of ⅛ (i.e., $M_r=⅛$) corresponds to a guard interval length of 128 samples (i.e., M=128). In this example, a total transmission block would include 1152 samples.

Figure 3:
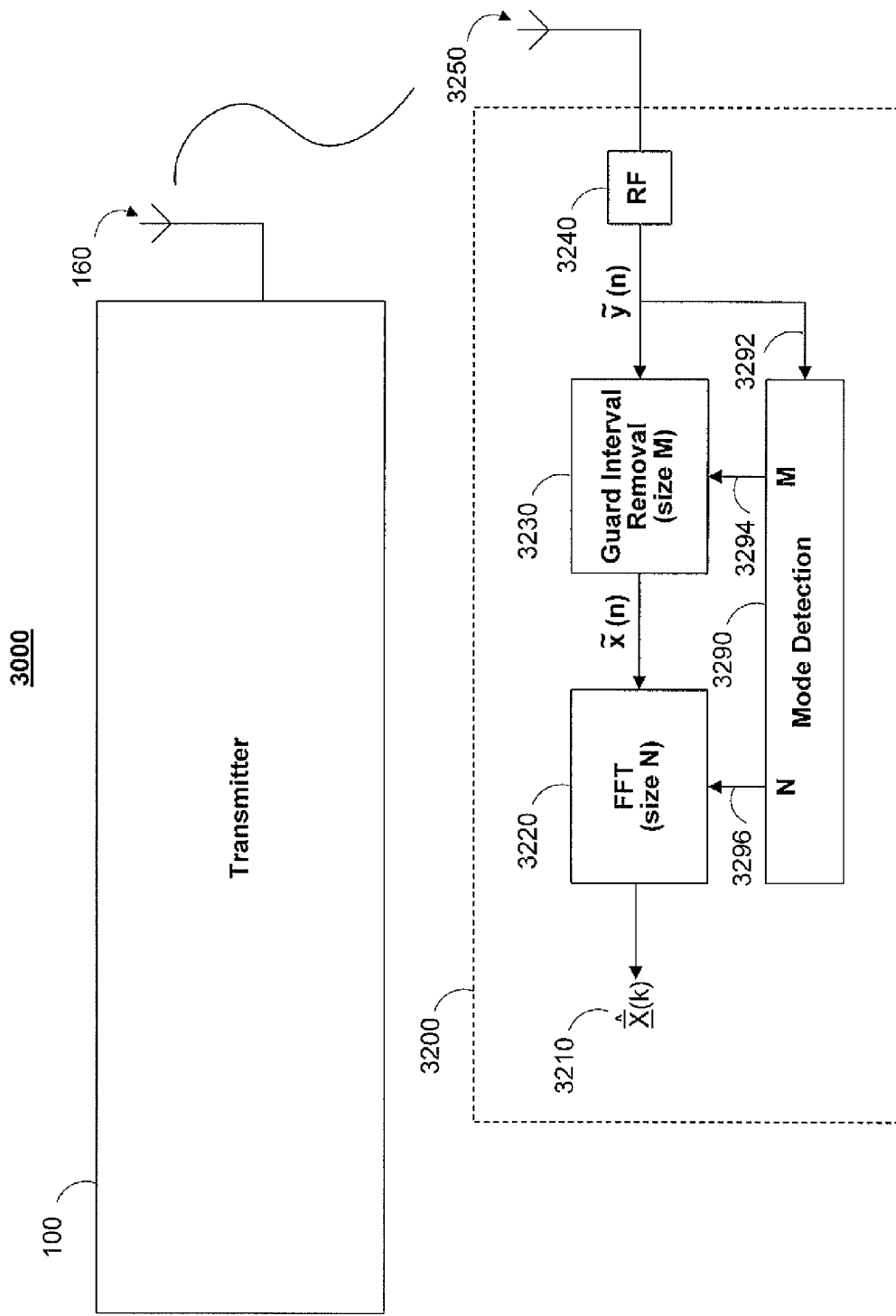
FIG. 3 is a simplified block diagram of an OFDM system in accordance with an embodiment of the present invention.

FIG. 3 shows OFDM system 3000 which may include transmitter 100 and receiver 3200. Transmitter 100 is analogous to transmitter 100 shown and described in connection with FIG. 1. Transmitter 100 may include an antenna 160 in order to transmit signals. Receiver 3200 may include at least an antenna 3250, RF circuitry 3240, mode detection circuitry 3290, guard interval (GI) removal circuitry 3230, FFT circuitry 3220 and frequency data 3210. Antenna 3250 may receive RF signals. Antenna 3250 may be configured to receive signals of frequencies which are appropriate for the electronics housed in receiver 3200. For example, antenna 3250 may receive a bandwidth of frequencies which may cover the areas of the spectrum around the frequencies of one or more carrier waves that may be transmitted by transmitter 100. RF circuitry 3240 may demodulate the received radio waves in order to separate the signal from the carrier waves. Additionally, RF circuitry 3240 may convert the signal into digital values. $\tilde{y}(n)$ can represent the digital signals which correspond to the radio waves received by antenna 3250.

Receiver 3200 may receive signals from different transmitters, depending on, for example, the location of the receiver. Each transmitter might be configured to generate signals in a different way (e.g., using different modes). For example, different transmitters might use IFFT circuitry of varying sizes and insert guard intervals of different lengths. In order to properly receive the various modes of signals, mode detection circuitry 3290 may detect the symbol length (N) and the guard interval length (M) used to generate the symbols received from input 3292. Mode detection circuitry 3290 can communicate these signal parameters (M and N) to the guard interval removal circuitry 3230 via output 3294 and to FFT circuitry 3220 via output 3296. Guard interval removal circuitry 3230 and FFT circuitry 3220 may use the parameters (M and N) for extracting data from the received signal $\tilde{y}(n)$. It is understood that mode detection circuitry 3290 may transmit guard interval size ($M_r$) instead of (or in addition to) guard interval length (M).

Mode detection circuitry 3290 may determine the symbol length (N) and the guard interval length (M) of the transmitted signal by employing any number of techniques described below. For example, mode detection circuitry may implement one or more correlation algorithms on a received signal. By analyzing the outputs of the correlations, mode detection circuitry 3290 may determine the symbol length (N) and the guard interval length (M) of the signal. An exemplary correlation algorithm may be performed in accordance with:

$$r_{i,j}(n) = \sum_{l=0}^{L-1} \tilde{y}(n+l)\tilde{y}(n+i+l) \qquad \text{Equation 1}$$

where $$L = i \times j \qquad \text{Equation 2}$$

where the received signal ($\tilde{y}(n)$) may be compared with a shifted version of itself ($\tilde{y}(n+i)$) over an interval (L=i×j) of samples. In the situation where the above correlation is applied to a received signal, i may represent a possible symbol length (N), and j may represent a possible guard interval size ($M_r$) that was used to generate the symbol.

For example, a symbol may be generated with a symbol length of 2048 samples (N=2048), and a guard interval that is ¼ of the symbol length ($M_r=¼$) may be inserted before the symbol. In this situation, the maximum amplitude of $r_{2048,1/4}(n)$ may be high because the relative delay of the correlated signals (i) is equal to the symbol length (N) of the received signal, and the summation interval (L=i×j) is equal to the length of the guard interval (M=N×$M_r$). Therefore, if i and j are chosen correctly, at the point (n) where the portion of the earlier signal ($\tilde{y}(n)$) is the guard interval, the portion of the delayed signal (y(n+i)) will be the portion of the symbol that was copied to create the guard interval. Accordingly, a high correlation value will be generated.

Figure 4:
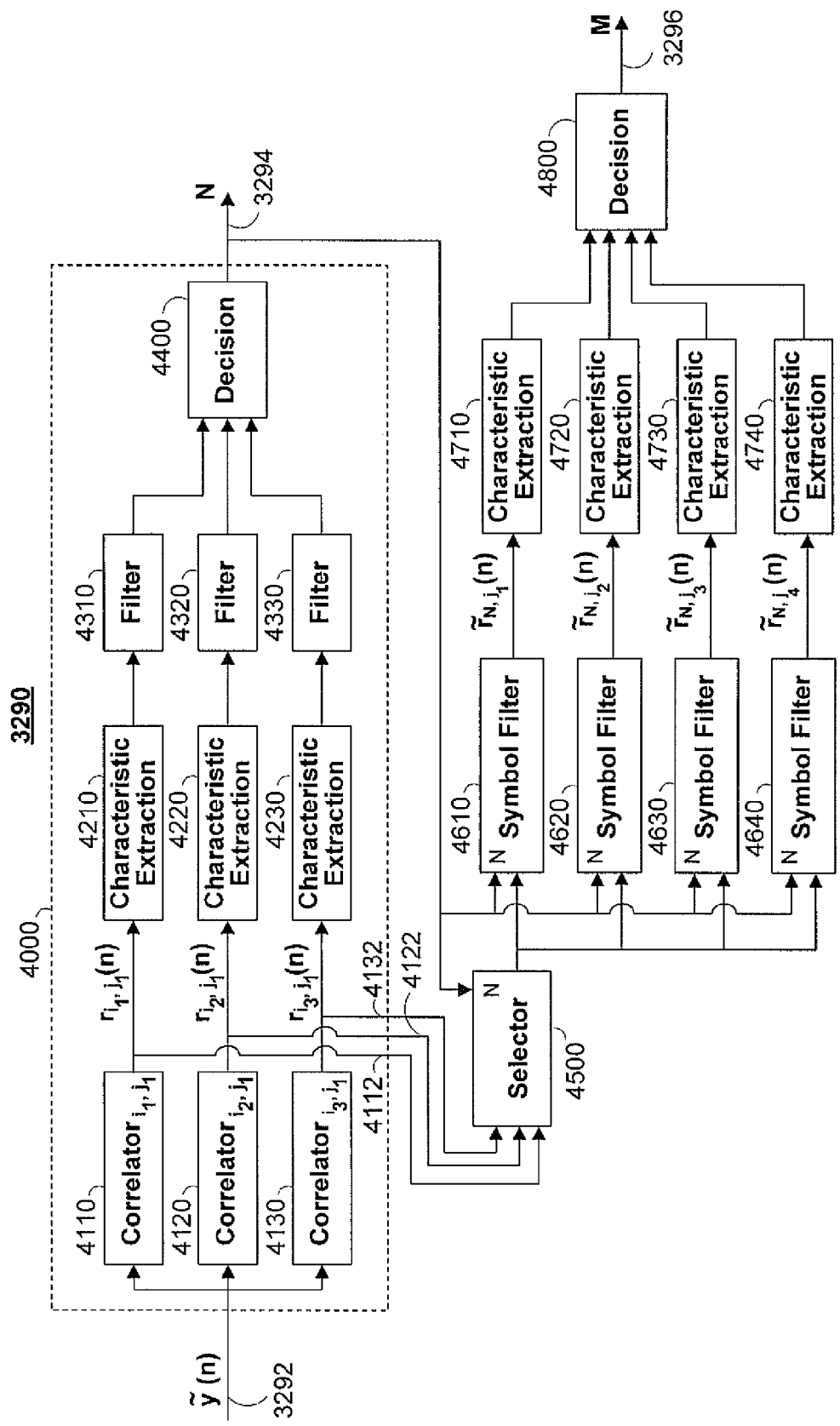
FIG. 4 is a simplified block diagram of mode detection circuitry in accordance with an embodiment of the present invention.

FIG. 4 shows an embodiment of mode detection circuitry 3290 in accordance with the principles of the present invention. Mode detection circuitry 3290 may include at least length detection circuitry 4000; selector circuitry 4500; symbol filters 4610, 4620, 4630 and 4640; characteristic extraction circuitry 4710, 4720, 4730 and 4740; decision circuitry 4800; an input 3292; and outputs 3294 and 3296.

Length detection circuitry 4000 may be configured to assume a guard interval (e.g., $j_1$) in order to determine the correct symbol length (N) of a received signal. After the correct symbol length (N) is determined, other parts of mode detection circuitry 3290 may be used to correctly determine the guard interval size ($M_r$) using the previously determined symbol length (N). For example, a correlated signal from length detection circuitry 4000 may be filtered according to the detected symbol length (N) to remove unnecessary data (e.g., correlation data that is not related to the guard interval of a received signal). The filtered correlation signal may then be used to determine the guard interval size ($M_r$) or guard interval length (M).

Length detection circuitry 4000 may include correlators 4110, 4120 and 4130; characteristic extraction circuitry 4210, 4220 and 4230; filters 4310, 4320 and 4330; and decision circuitry 4400. Correlators 4110, 4120 and 4130 may be configured to correlate input 3292 with a delayed version of itself in accordance with Equations 1 and 2. It is understood that although only three correlators 4110, 4120 and 4130 are drawn, any number of correlators may be used to detect the symbol length (N) of the received signal. It is also understood that one correlation unit may generate the same correlation signals as correlators 4110, 4120 and 4130. Such a central correlation unit may be able to simplify implementation by, for example, sharing circuitry related to common functions across all three correlators 4110, 4120 and 4130.

Each of correlators 4110, 4120 and 4130 can be configured to use the same possible guard interval size (e.g., $j_1$) and different possible symbol lengths (e.g., $i_1$, $i_2$, $i_3$). This can allow length detection circuitry 4000 to compute which i value is the actual value of the received signal's symbol length (N).

Possible guard interval size $j_1$ may be chosen so that it is smaller than any of the other possible guard interval sizes. This is because the smaller guard interval size will result in a smaller summation interval (L=i×j) which can fit within the larger guard intervals and still generate a strong correlation signal.

An example of a possible configuration of correlators 4110, 4120 and 4130 would be to set the parameters in accordance with:

$$j_1 = 1/32 \qquad \text{Equation 3}$$

$$i_1 = 2048 \qquad \text{Equation 4}$$

$$i_2 = 4096 \qquad \text{Equation 5}$$

$$i_3 = 8192 \qquad \text{Equation 6}$$

Where $j_1$ may be the smallest possible guard interval size. In this scenario, the receiver will be able to detect which possible symbol length out of $i_1$, $i_2$ and $i_3$ was the actual symbol length (N) used to generate the received signal. The correlation outputs can be processed through characteristic extraction circuitry 4210, 4220 and 4230 which can measure characteristics (e.g. ratio of peak amplitude to average amplitude, number of peaks, maximum peak amplitude, etc.) of the correlation signals. The outputs of characteristic extraction circuitry 4210, 4220 and 4230 can be sent through filters 4310, 4320 and 4330.

Filters 4310, 4320 and 4330 may filter characteristic data so that decision circuitry 4400 can more efficiently compare the characteristics of the three correlation signals $r_{i_1,j_1}(n)$, $r_{i_2,j_1}(n)$ and $r_{i_3,j_1}(n)$. For example, filters 4310, 4320 and 4330 can remove any falsely detected characteristics and scale the characteristic data. This may allow the data from each correlation signal to be easily compared.

Decision circuitry 4400 can compare the characteristic data of the different correlation signals in order to determine which signal has the strongest correlation. Decision circuitry 4400 may apply a weighted function to one or more characteristics of the correlation signal. For example, decision circuitry 4400 may designate the correlation signal with the highest ratio of peak amplitude to average amplitude and the lowest peak count as being the signal with the strongest correlation. Decision circuitry 4400 can output the symbol length (N) which corresponds to the strongest correlation signal. For example, decision circuitry 4400 can output the value of $i_2$ if the correlation signal from correlator 4120 has characteristics which indicate that it is the strongest of the three correlation signals.

Output 3294 can be coupled to any other circuitry that might benefit from knowing the symbol length of the received signal. For example, output 3294 can be coupled to FFT circuitry (see circuitry 3220 in FIG. 3) which can configure itself according to the detected symbol length (N). Length detection circuitry 4000 may connect the correlation signals from correlators 4110, 4120 and 4130 with outputs 4112, 4122 and 4132. These signals may be used by other parts of mode detection circuitry 3290 in order to simplify computations. For example, other portions of mode detection circuitry 3290 may be electrically coupled with outputs 4112, 4122, and 4132 such that they do not have to recorrelate the received signal.

Mode detection circuitry 3290 can also detect the guard interval of a received signal. By using the symbol length (N) determined by decision circuitry 4400, mode detection circuitry 3290 can filter one or more of the signals from correlators 4110, 4120 and 4130 according to possible guard interval sizes (e.g., $j_1$, $j_2$, $j_3$, $j_4$) and the previously detected symbol length (N).

Selector circuitry 4500 can route an appropriate correlation signal (e.g., according to determined symbol length N) to symbol filters 4610, 4620, 4630 and 4640. It is understood that although only four symbol filters 4610, 4620, 4630 and 4640 are shown, any number of filters may be used to detect the guard interval size of the received signal.

Symbol filters 4610, 4620, 4630 and 4640 may be filters designed to evaluate the correlation signal from selector circuitry 4500 according to different guard interval sizes. For example, symbol filter 4610 may correspond to a first possible guard interval size ($j_1$), symbol filter 4620 may correspond to a second possible guard interval size ($j_2$), symbol filter 4630 may correspond to a third possible guard interval size ($j_3$) and symbol filter 4640 may correspond to a fourth possible guard interval size ($j_4$). The outputs of symbol filters 4610, 4620, 4630 and 4640 can be computed in accordance with:

$$\tilde{r}_{N,j}(n) = \sum_{v=0}^{V-1} |r_{N,j_1}(n)| h(v(N(1+j))-n) \quad \text{Equation 7}$$

In the above equation, N can represent the symbol length determined by length detection circuitry 4000, and N(1+j) can represent a possible combined symbol and guard interval length. The value of N(1+j) can set the spacing between the samples of the correlation signal $r_{N,j_1}(n)$ that are evaluated by each symbol filter. If N and j are selected correctly, the value of N(1+j) will be the total length of one symbol and guard interval. According to Equation 7, if the value of j which doesn't correspond to the actual guard interval size ($M_r$) is used then the output of the symbol filter may have low values because the symbol filter has evaluated samples of the correlation signal with low values. These low values may indicate that the corresponding portions of the received signal are not highly correlated and, therefore, the symbol filter used an improper value of j. Alternatively, if the correct value of j is used then the samples of the correlation signal which the filter evaluates may consistently have high values which represent a strong correlation between the corresponding portions of the received signal.

In Equation 7, the value of V can be predetermined and can affect how many correlation signal samples each symbol filter evaluates. It may be advantageous to select a value of V which is large enough to properly determine if the correlation signal samples have a consistently high value. It may also be advantageous to select a value of V which is small enough to not waste any unnecessary time or computational power. In some embodiments, each symbol filter can include a one-pole filter which averages two or more samples of the correlation signal. For example, if V samples of a correlation signal are evaluated, the sum of the values can be divided by V to give an average correlation value. This average value can be indicative of whether or not the value of j corresponds to the correct guard interval size ($M_r$).

Symbol filters 4610, 4620, 4630 and 4640 may be coupled with output 3294 of decision circuitry 4400. This output may provide symbol filters 4610, 4620, 4630 and 4640 with the detected symbol length value (N) to use when evaluating correlation signals in accordance with Equation 7.

An example of a possible configuration of symbol filters 4610, 4620, 4630 and 4640 would be to set the parameters as follows:

$$j_1 = 1/32 \quad \text{Equation 8}$$

$$j_2 = 1/16 \quad \text{Equation 9}$$

$$j_3 = 1/8 \quad \text{Equation 10}$$

$$j_4 = 1/4 \quad \text{Equation 11}$$

The resulting filter outputs may each correspond to a different possible guard interval size ($M_r$). The outputs of symbol filters 4610, 4620, 4630 and 4640 can be coupled with characteristic extraction circuitry 4710, 4720, 4730 and 4740 which can measure one or more characteristics of the correlation signals.

Characteristic extraction circuitry 4710, 4720, 4730 and 4740 may measure the same or different characteristics as characteristic extraction circuitry 4210, 4220 and 4230. If characteristic extraction circuitry 4710, 4720, 4730 and 4740 functions in a manner that is similar to characteristic extraction circuitry 4210, 4220 and 4230, then part or all of characteristic extraction circuitry 4210, 4220 and 4230 can be used in place of part or all of characteristic extraction circuitry 4710, 4720, 4730 and 4740. Characteristic extraction circuitry 4710, 4720, 4730 and 4740 can measure, for example, the ratio of peak amplitude to average amplitude, the number of peaks, or the average peak amplitude. Decision circuitry 4800 can output the guard interval length (M) or guard interval size ($M_r$) which corresponds to the strongest correlation signal. It is understood that once the symbol length (N) and guard interval size ($M_r$) are known, the guard interval length (M=N×$M_r$) can be easily computed for any of the embodiments discussed herein. Output 3296 can be coupled to any other circuitry that might benefit from knowing the guard interval size of the received signal. For example, output 3294 can be coupled to guard interval removal circuitry (e.g., circuitry 3230 in FIG. 3) which can configure itself in response to the detected guard interval length (M) or guard interval size ($M_r$).

Figure 5:
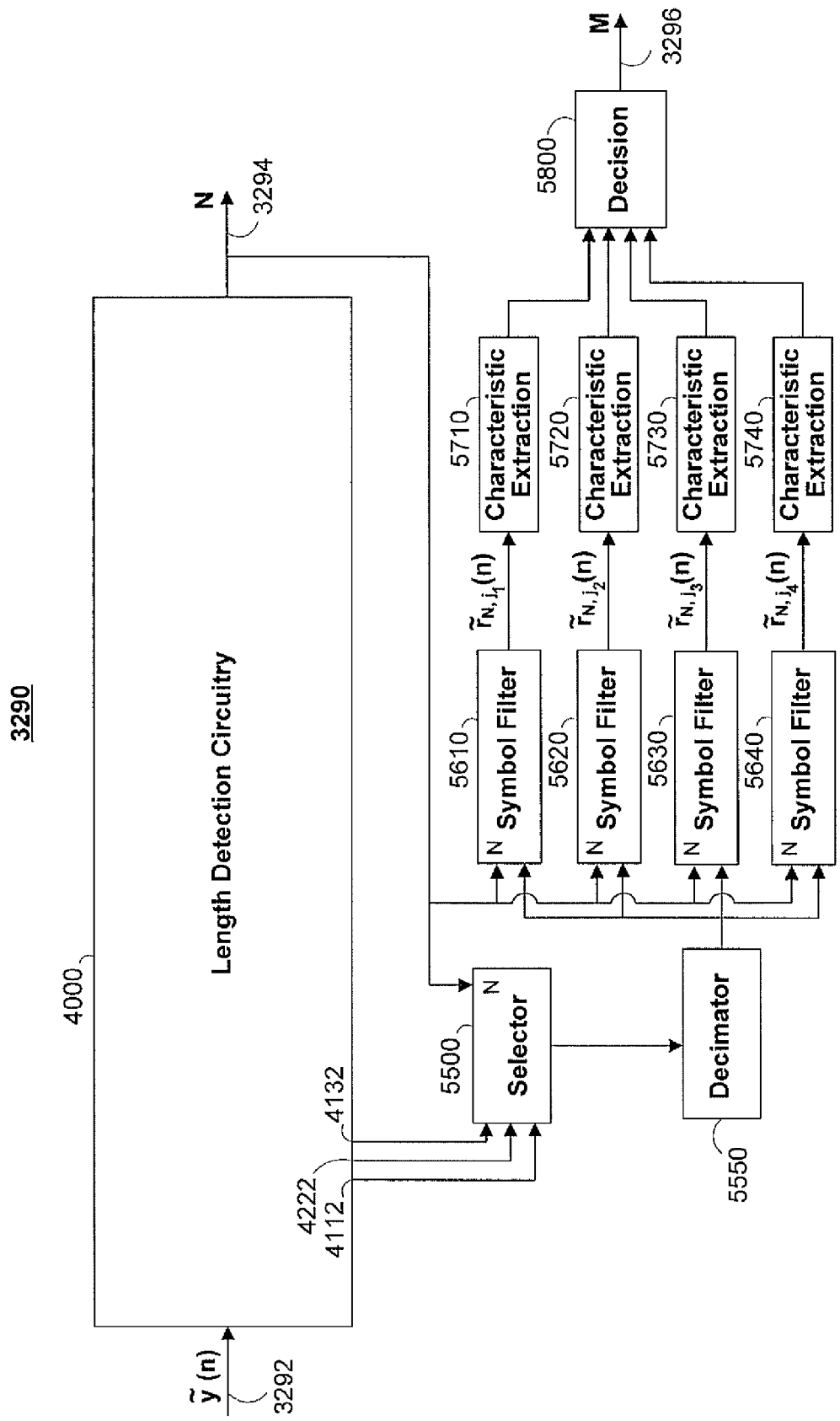
FIG. 5 is a simplified block diagram of mode detection circuitry in accordance with another embodiment of the present invention.

FIG. 5 shows an embodiment of mode detection circuitry 3290 in accordance with the principles of the present invention. Mode detection circuitry 3290 can include length detection circuitry 4000; a selector 5500; a decimator 5550; symbol filters 5610, 5620, 5630 and 5640; characteristic extraction circuitry 5710, 5720, 5730 and 5740; decision circuitry 5800; input 3292 and outputs 3294 and 3296. Length detection circuitry 4000 is analogous to length detection circuitry 4000 shown and described in connection with FIG. 4. Length detection circuitry may include correlators, characteristic extraction circuitry, filters and decision circuitry (not shown) similar to the elements shown in length detection circuitry 4000 of FIG. 4. The correlator signal outputs 4112, 4122 and 4132 may be coupled with selector circuitry 4500 for distribution to other parts of mode detector circuitry 3290. Additionally, the detected symbol length (N) output 3294 of length detection circuitry 4000 can be coupled with selector 5500 and symbol filters 5610, 5620, 5630 and 5640.

Selector 5500 can route the correlation signal which corresponds to the determined symbol length N to decimator 5550. Decimator 5550 may down-sample the correlation signal by a predetermined rate (e.g., ¼, ½). For example, decimator 5550 may average every four samples to produce one output or may keep every fourth sample and disregard the rest. This down-sampling may simplify the design and minimize the size of symbol filters 5610, 5620, 5630 and 5640 as well as characteristic extraction circuitry 5710, 5720, 5730 and 5740.

The output of decimator 5550 may be coupled with the inputs of symbol filters 5610, 5620, 5630 and 5640. It is understood that although only four symbol filters 5610, 5620, 5630 and 5640 are drawn, any number of symbol filters may be used to detect the guard interval of the received signal.

Symbol filters 5610, 5620, 5630 and 5640 can be similar, respectively, to symbol filters 4610, 4620, 4630, and 4640 of FIG. 4. Accordingly, symbol filters 5610, 5620, 5630 and 5640 can implement Equation 7. However, symbol filters 5610, 5620, 5630 and 5640 may adjust the received value of N to compensate for the amount of down-sampling that is performed by decimator 5550. For example, if length detection circuitry 4000 determines that the value of N is $i_3$, and decimator 5550 down-samples the correlation signal by 4 samples, then symbol filters 5610, 5620, 5630 and 5640 may use $i_3/4$ as the value of N.

Symbol filters 5610, 5620, 5630 and 5640 may output filtered correlation signals $\tilde{r}_{N,j_1}(n)$, $\tilde{r}_{N,j_2}(n)$, $\tilde{r}_{N,j_3}(n)$ and $\tilde{r}_{N,j_4}(n)$ to characteristic extraction circuitry 5710, 5720, 5730 and 5740 which can measure one or more characteristics (e.g. ratio of peak amplitude to average amplitude, number of peaks, maximum peak amplitude, etc.) of the filtered correlation signals. The outputs of characteristic extraction circuitry 5710, 5720, 5730 and 5740 can be sent to decision circuitry 5800. Decision circuitry 5800 may analyze the characteristic data for each filtered correlation signal to determine the appropriate guard interval length (M) or guard interval size ($M_r$). Decision circuitry 5800 may apply a weighted function to one or more measured characteristics of the filtered correlation signals. Decision circuitry 5800 may, for example, output the guard interval length which corresponds to the filtered correlation signal with the highest ratio of peak amplitude to average amplitude, the most number of peaks above a certain threshold or the maximum peak amplitude. Output 3296 can be coupled to any other circuitry that may benefit from knowing the guard interval size of the received signal. For example, output 3296 can be coupled to guard interval removal circuitry (e.g., circuitry 3230 of FIG. 3) which can configure itself in response to the detected guard interval length (M).

Figure 6:
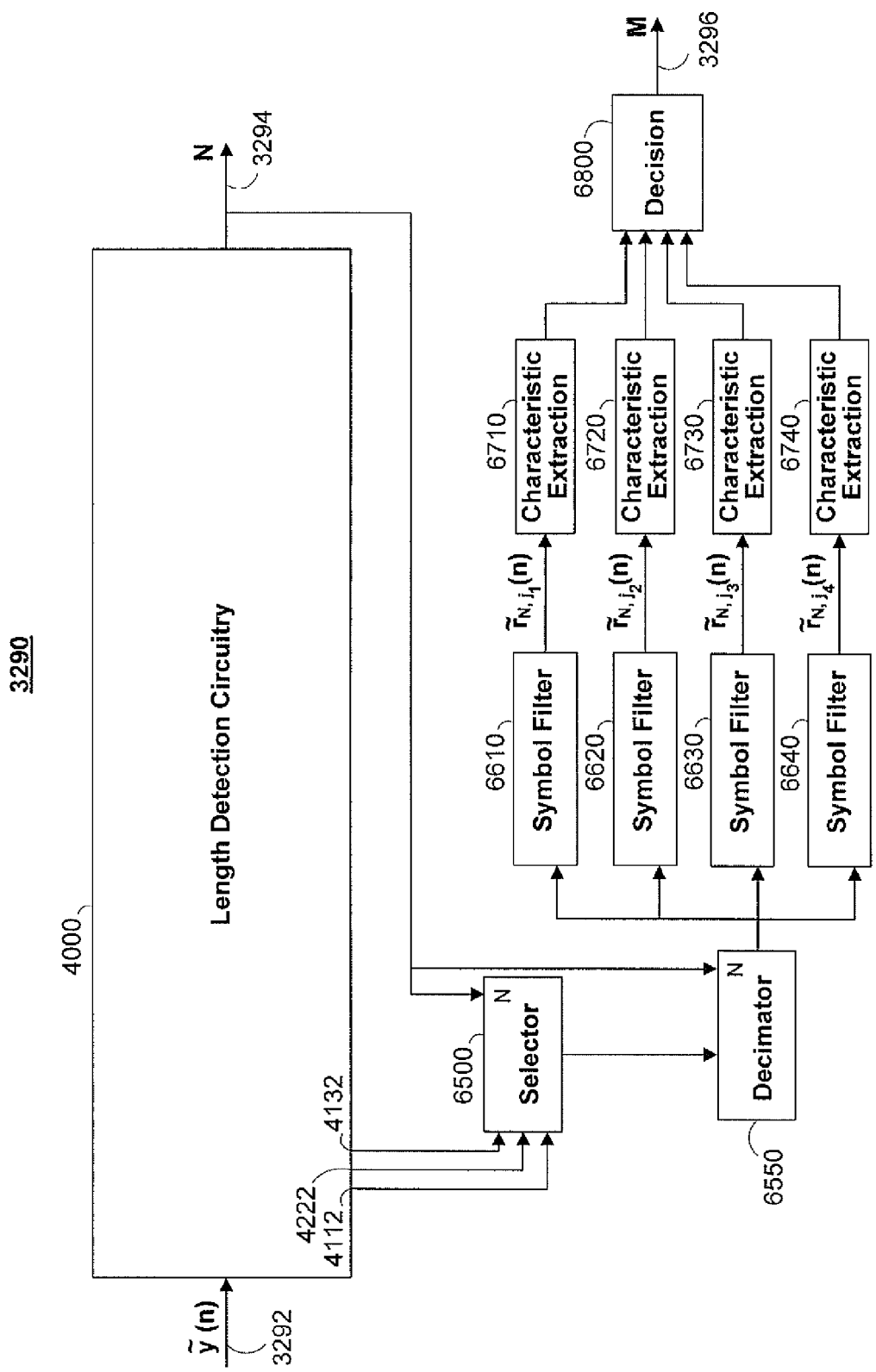
FIG. 6 is a simplified block diagram of mode detection circuitry in accordance with yet another embodiment of the present invention.

FIG. 6 shows an embodiment of mode detection circuitry 3290 in accordance with the principles of the present invention. Mode detection circuitry 3290 can include length detection circuitry 4000; characteristic extraction circuitry 6710, 6720, 6730 and 6740; decision circuitry 6800; a selector 6500; a decimator 6550; symbol filters 6610, 6620, 6630 and 6640; input 3292 and outputs 3294 and 3296.

Length detection circuitry 4000 may be configured to assume a guard interval (e.g., $j_1$) in order to determine the correct symbol length (N) of a received signal. After the correct symbol length (N) is determined, the correlated signals from length detection circuitry 4000 may be down-sampled according to the determined symbol length (N). This down-sampled signal may then be filtered to determine the guard interval length (M). If the correlation signals have been down-sampled to a standard size, the symbol filters 6610, 6620, 6630 and 6640 used to process the correlation data may not have to be adjusted to compensate for the determined symbol length (N).

Length detection circuitry 4000 is analogous to length detection circuitry 4000 shown and described in connection with FIG. 4. Length detection circuitry may include correlators, characteristic extraction circuitry, filters and decision circuitry (not shown) similar to the elements shown in length detection circuitry 4000 of FIG. 4. The correlator signal outputs 4112, 4122 and 4132 may be coupled with selector 6500 for distribution to other parts of mode detector circuitry 3290. Additionally, the detected symbol length (N) output 3294 of length detection circuitry 4000 can be coupled with selector 6500 and decimator 6550. Selector 6500 can route the correlation signal which corresponds to the detected symbol length N to decimator 6550, and decimator 6550 may down-sample the correlation signal by an amount that is dependant upon the detected symbol length N.

The amount of down-sampling may be chosen so that the period or length of the correlation signal at the decimator output is the same regardless of the received signal's length. For example, if the value of symbol length N is determined to be 8192 samples, decimator 6550 may down-sample the correlation signal by 8, and if the value of N is determined to 2048 samples, decimator 6550 may down-sample the correlation signal by 2. The output of decimator 6550 can be coupled with the inputs of symbol filters 6610, 6620, 6630 and 6640 which can evaluate samples of the correlation signal which correspond to different guard intervals.

Symbol filters 6610, 6620, 6630 and 6640 can function in a manner that is similar to symbol filters 5610, 5620, 5630 and 5640 of mode detection circuitry 3290 in FIG. 5. However, the outputs of filters 6610, 6620, 6630 and 6640 can be computed in accordance with:

$$\tilde{r}_{N,u}(n) = \sum_{v=0}^{V-1} |r_{N,j_1}(n)| h(v(G(1+u))-n) \qquad \text{Equation 12}$$

In the above equation, G can be chosen to correspond to the period or length of the correlation signal that is output from decimator 6550.

Following the above example, if value of N is 8192 samples then decimator 6550 may down-sample by 8; and if the value of N is 2048 samples then decimator 6550 may down-sample by 2. In this example, G may be chosen to be 1024 since that may be the standard period or length of down-sampled correlation signals. By changing the decimation scale in response to the determined symbol length N, the scaling factor G in symbol filters 6610, 6620, 6630 and 6640 may not need to be changed according to the value of N.

It is understood that although only four symbol filters 6610, 6620, 6630 and 6640 are drawn, any number of filters may be used to detect the guard interval of the received signal. It is also understood that one filter circuit can be used to filter all of the correlation signals. Such a filter circuit may be able to simplify implementation by, for example, sharing circuitry related to functions common across filters 6610, 6620 and 6630.

The examples shown above reference symbol lengths of 2048, 4096 and 8192, and guard interval sizes of ¼, ⅛, 1/16 and 1/32. However, it is understood that other symbol lengths and guard interval sizes can be used without deviating from the spirit of the present invention.

Figure 7:
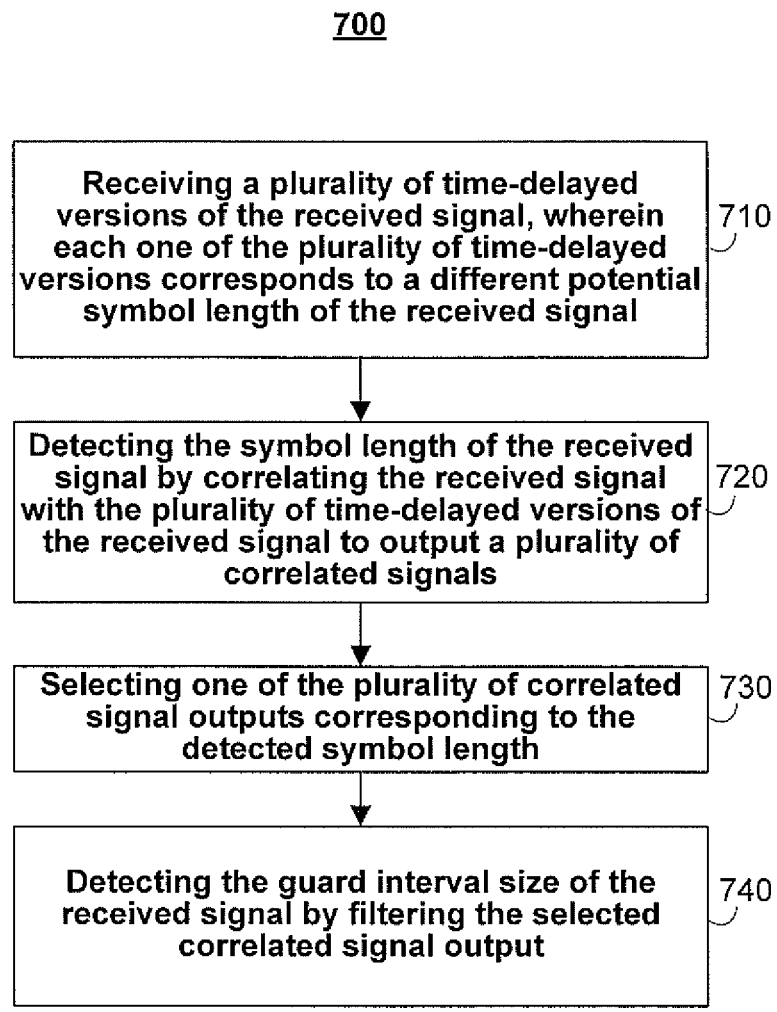
FIG. 7 is a flowchart of a mode detection method in accordance with an embodiment of the present invention.

FIG. 7 shows a flowchart of method 700 for detecting the mode of a received OFDM signal in accordance with an embodiment of the present invention. At step 710, a plurality of time-delayed versions of the received signal may be received, wherein each one of the plurality of time-delayed versions corresponds to a different potential symbol length of the received signal. At step 720, the symbol length of the received signal may be detected by correlating the received signal with the plurality of time-delayed versions of the received signal to output a plurality of correlated signals. At step 730, one of the plurality of correlated signal outputs may be selected corresponding to the detected symbol length. At step 740, the guard interval size of the received signal may, be detected by filtering the selected correlated signal output.

Figure 8:
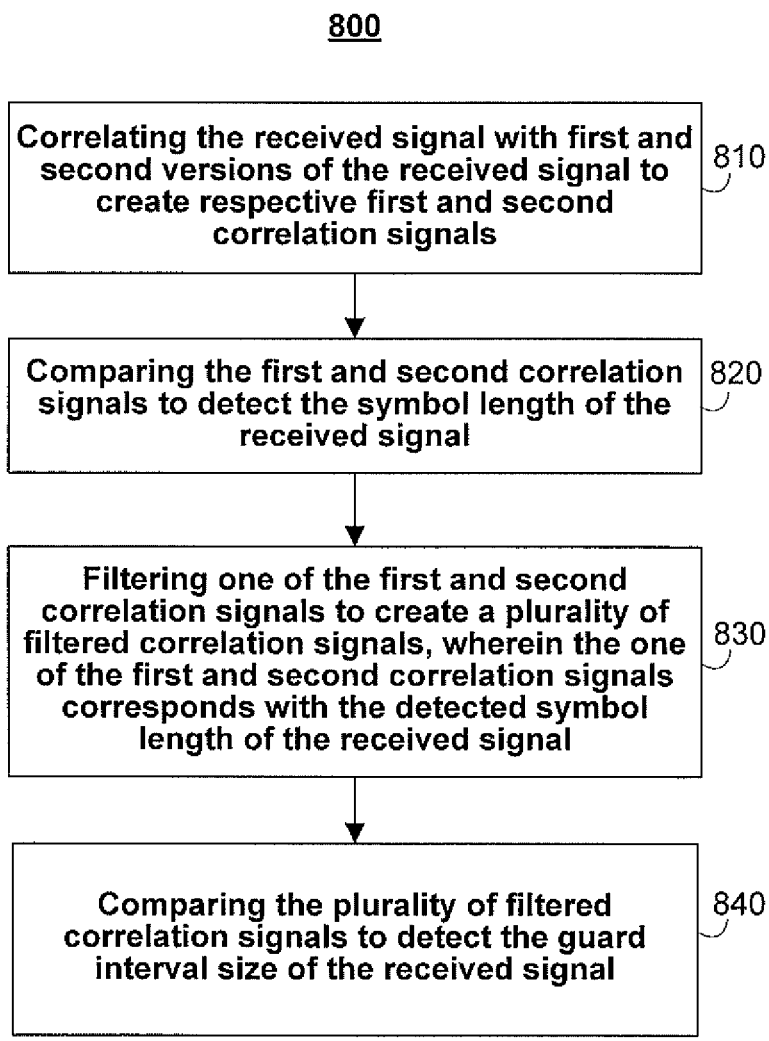
FIG. 8 is a flowchart of a mode detection method in accordance with another embodiment of the present invention.

FIG. 8 shows a flowchart of method 800 for detecting the mode of a received OFDM signal in accordance with another embodiment of the present invention. At step 810, the received signal may be correlated with first and second versions of the received signal to create respective first and second correlation signals. At step 820, the first and second correlation signals may be compared to detect the symbol length of the received signal. At step 830, one of the first and second correlation signals may be filtered to create a plurality of filtered correlation signals, wherein the one of the first and second correlation signals corresponds with the detected symbol length of the received signal. At step 840, the plurality of filtered correlation signals may be compared to detect the guard interval size of the received signal.

Referring now to FIGS. 9A-9G, various exemplary implementations of the present invention are shown.

Figure 9A:
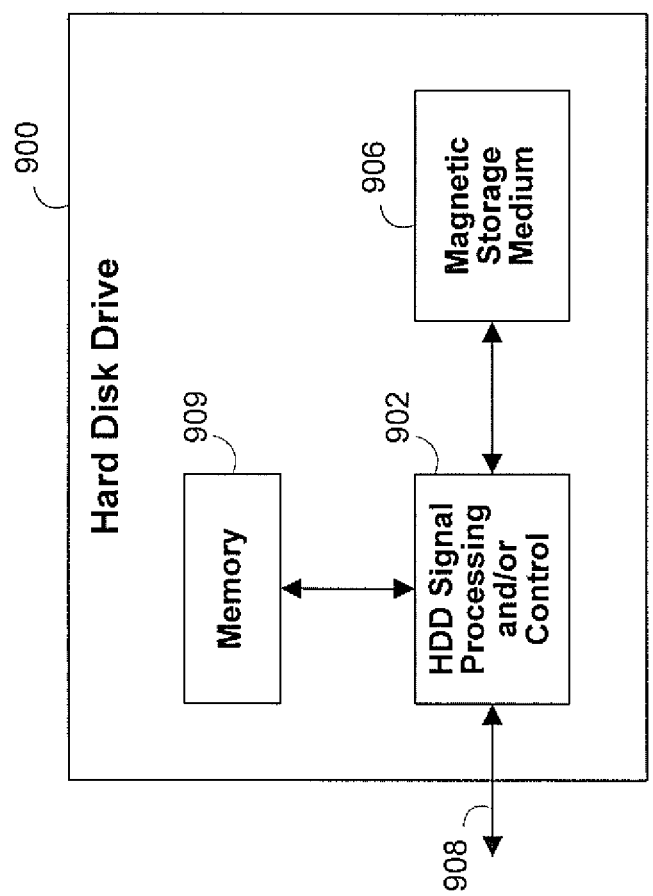
FIG. 9A is a block diagram of an exemplary hard disk drive that can employ the disclosed technology.

Referring now to FIG. 9A, the present invention can be implemented in a hard disk drive 900. The present invention may implement either or both signal processing and/or control circuits, which are generally identified in FIG. 9A at 902. In some implementations, the signal processing and/or control circuit 902 and/or other circuits (not shown) in the HDD 900 may process data, perform coding and/or encryption, and/or perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links 908. The HDD 900 may be connected to memory 909 such as random access memory (RAM), nonvolatile memory such as flash memory, read only memory (ROM) and/or other suitable electronic data storage.

Figure 9B:
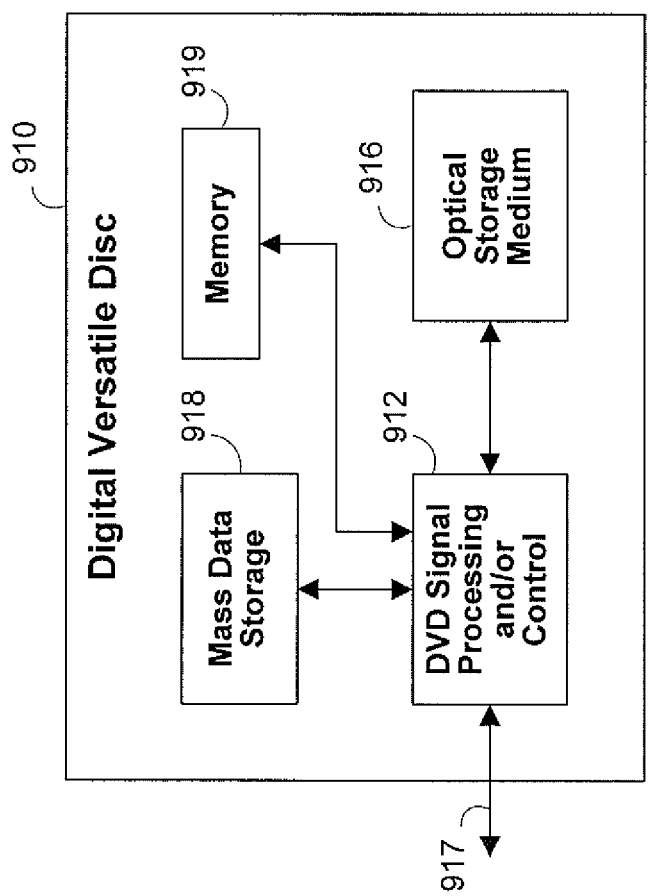
FIG. 9B is a block diagram of an exemplary digital versatile disc that can employ the disclosed technology.

Referring now to FIG. 9B, the present invention can be implemented in a digital versatile disc (DVD) drive 910. The present invention may implement either or both signal processing and/or control circuits, which are generally identified in FIG. 93 at 912, and/or mass data storage of the DVD drive 910. The signal processing and/or control circuit 912 and/or other circuits (not shown) in the DVD drive 910 may process data, perform coding and/or encryption, perform calculations, and/or format data that is read from and/or data written to an optical storage medium 916. In some implementations, the signal processing and/or control circuit 912 and/or other circuits (not shown) in the DVD drive 910 can also perform other functions such as encoding and/or decoding and/or any other signal processing functions associated with a DVD drive.

The DVD drive 910 may communicate with an output device (not shown) such as a computer, television or other device via one or more wired or wireless communication links 917. The DVD drive 910 may communicate with mass data storage 918 that stores data in a nonvolatile manner. The mass data storage 918 may include a hard disk drive (HDD). The HDD may have the configuration shown in FIG. 9A. The HDD may be a mini HDD that includes one or more platters having a diameter that is smaller than approximately 1.8". The DVD drive 910 may be connected to memory 919 such as RAM, ROM, nonvolatile memory such as flash memory and/or other suitable electronic data storage.

Figure 9C:
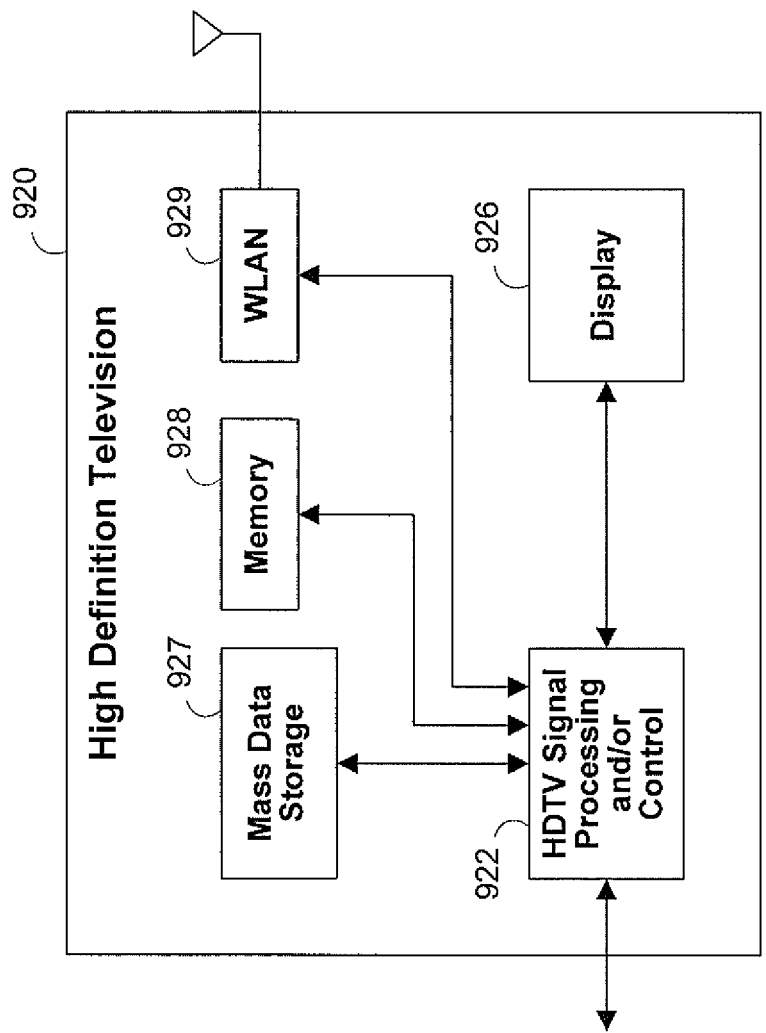
FIG. 9C is a block diagram of an exemplary high definition television that can employ the disclosed technology.

Referring now to FIG. 9C, the present invention can be implemented in a high definition television (HDTV) 920. The present invention may implement either or both signal processing and/or control circuits, which are generally identified in FIG. 9C at 922, a WLAN interface 929 and/or mass data storage 927 of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, and/or perform calculations, format data and/or perform any other type of HDTV processing that may be required.

The HDTV 920 may communicate with mass data storage 927 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 920 may be connected to memory 928 such as RAM, ROM, nonvolatile memory such as flash memory and/or other suitable electronic data storage. The HDTV 920 also may support connections with a WLAN via a WLAN network interface 929.

Figure 9D:
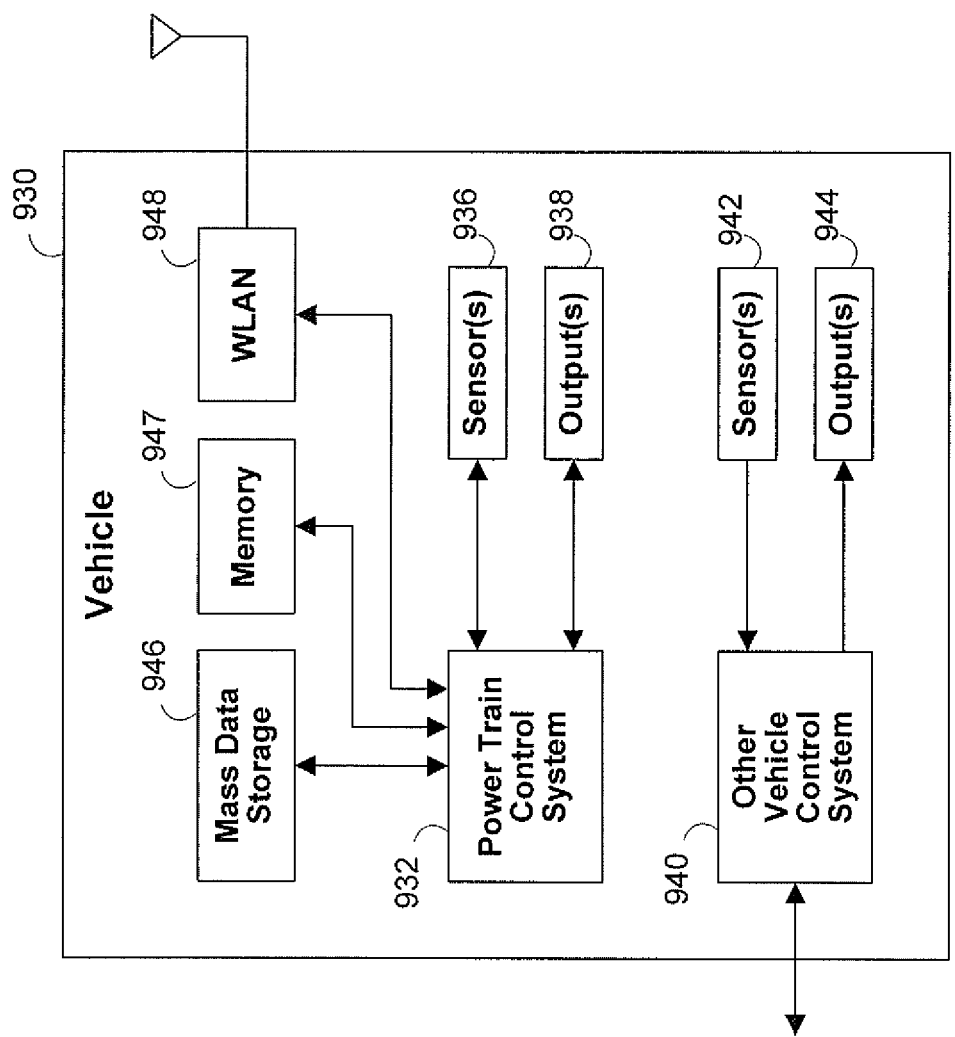
FIG. 9D is a block diagram of an exemplary vehicle that can employ the disclosed technology.

Referring now to FIG. 9D, the present invention implements a control system of a vehicle 930, a WLAN interface 948 and/or mass data storage 946 of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 930. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The powertrain control system 932 may be connected to memory 947 such as RAM, ROM, nonvolatile memory such as flash memory and/or other suitable electronic data storage. The powertrain control system 932 also may support connections with a WLAN via a WLAN network interface 948. The control system 940 may also include mass data storage, memory and/or a WLAN interface (all not shown).

Figure 9E:
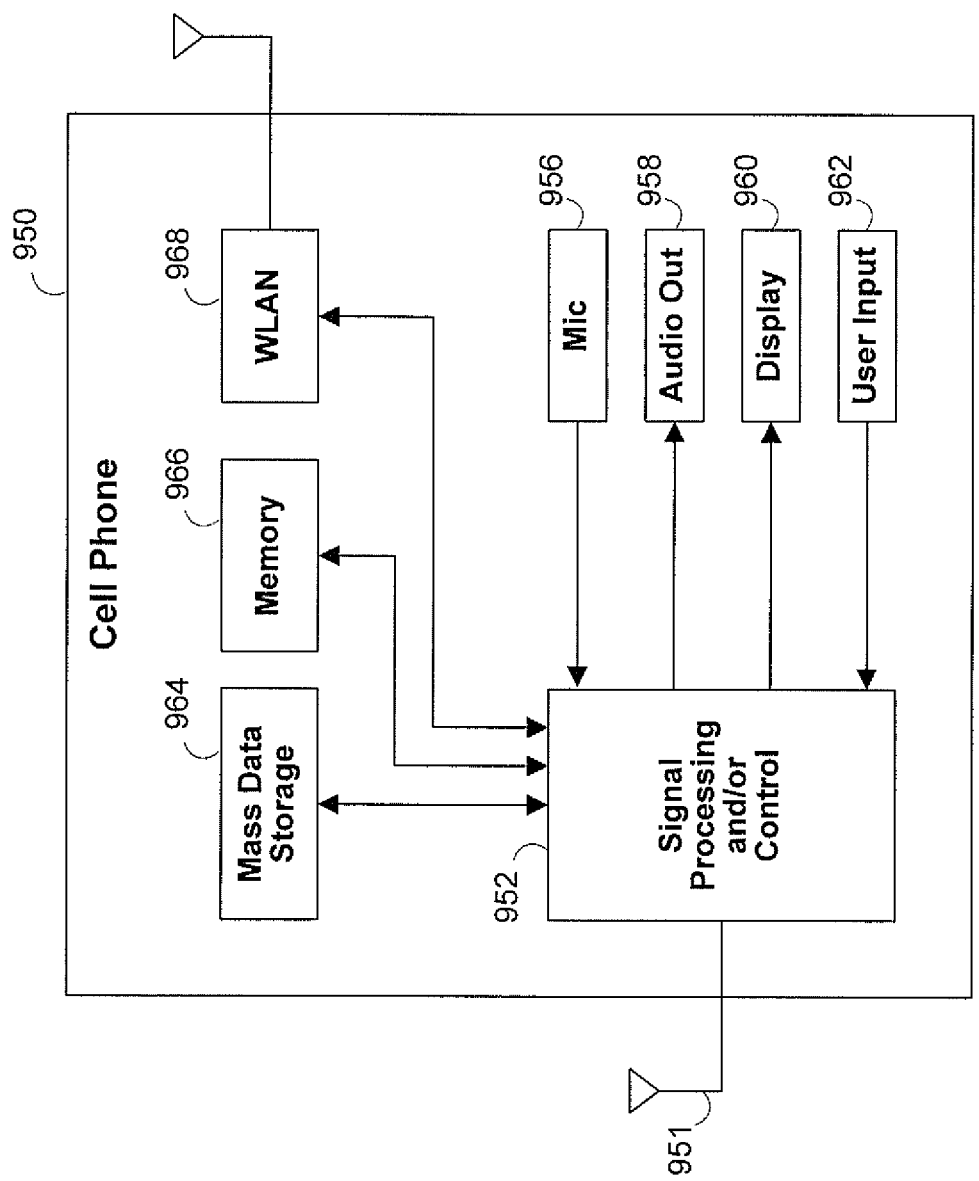
FIG. 9E is a block diagram of an exemplary cell phone that can employ the disclosed technology.

Referring now to FIG. 9E, the present invention can be implemented in a cellular phone 950 that may include a cellular antenna 951. The present invention may implement either or both signal processing and/or control circuits, which are generally identified in FIG. 9E at 952, a WLAN interface 968 and/or mass data storage 964 of the cellular phone 950. In some implementations, the cellular phone 950 includes a microphone 956, an audio output 958 such as a speaker and/or audio output jack, a display 960 and/or user input 962 such as a keypad, pointing device, voice actuation and/or other input device. The signal processing and/or control circuits 952 and/or other circuits (not shown) in the cellular phone 950 may process data, perform coding and/or encryption, and/or perform calculations, format data and/or perform other cellular phone functions.

The cellular phone 950 may communicate with mass data storage 964 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 950 may be connected to memory 966 such as RAM, ROM, nonvolatile memory such as flash memory and/or other suitable electronic data storage. The cellular phone 950 also may support connections with a WLAN via a WLAN network interface 968.

Figure 9F:
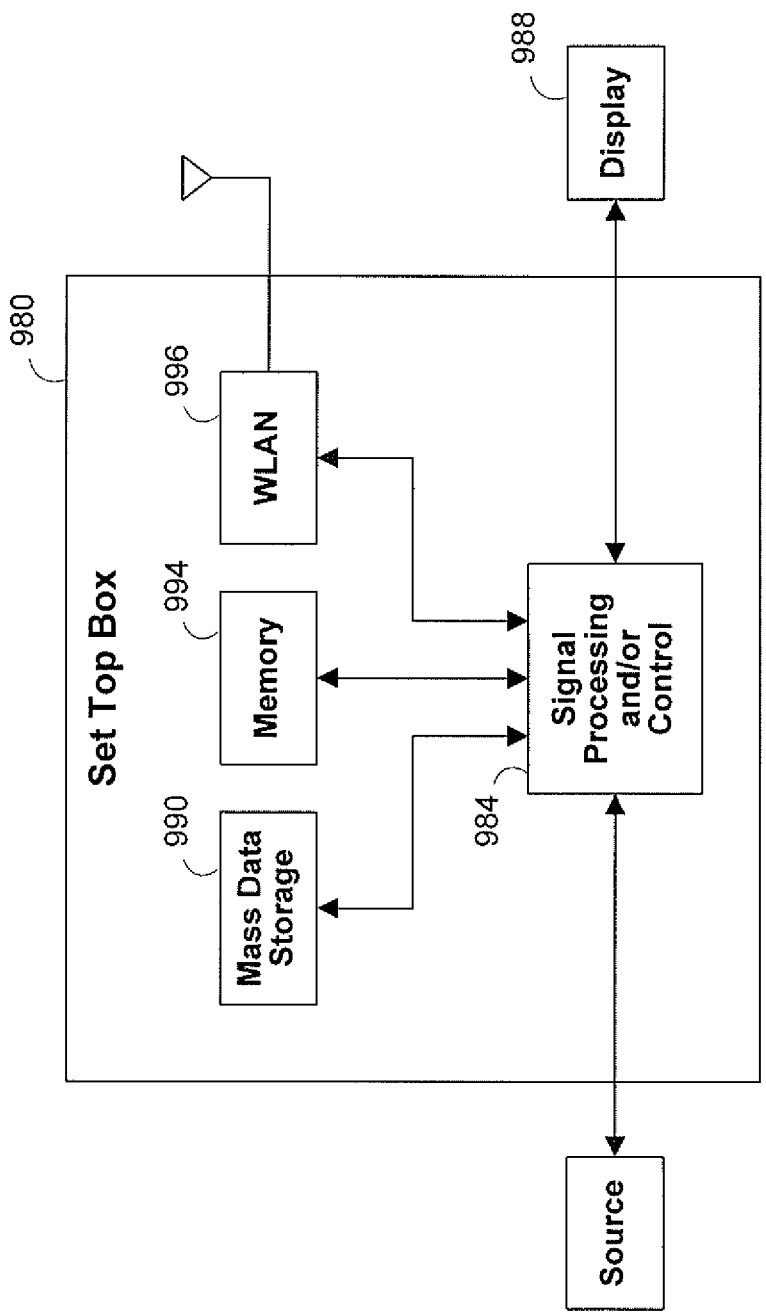
FIG. 9F is a block diagram of an exemplary set top box that can employ the disclosed technology.

Referring now to FIG. 9F, the present invention can be implemented in a set top box 980. The present invention may implement either or both signal processing and/or control circuits, which are generally identified in FIG. 9F at 984, a WLAN interface 996 and/or mass data storage 990 of the set top box 980. The set top box 980 receives signals from a source such as a broadband source and outputs standard and/or high definition audio/video signals suitable for a display 988 such as a television and/or monitor and/or other video and/or audio output devices. The signal processing and/or control circuits 984 and/or other circuits (not shown) of the set top box 980 may process data, perform coding and/or encryption, and/or perform calculations, format data and/or perform any other set top box function.

The set top box 980 may communicate with mass data storage 990 that stores data in a nonvolatile manner. The mass data storage 990 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 980 may be connected to memory 994 such as RAM, ROM, nonvolatile memory such as flash memory and/or other suitable electronic data storage. The set top box 980 also may support connections with a WLAN via a WLAN network interface 996.

Figure 9G:
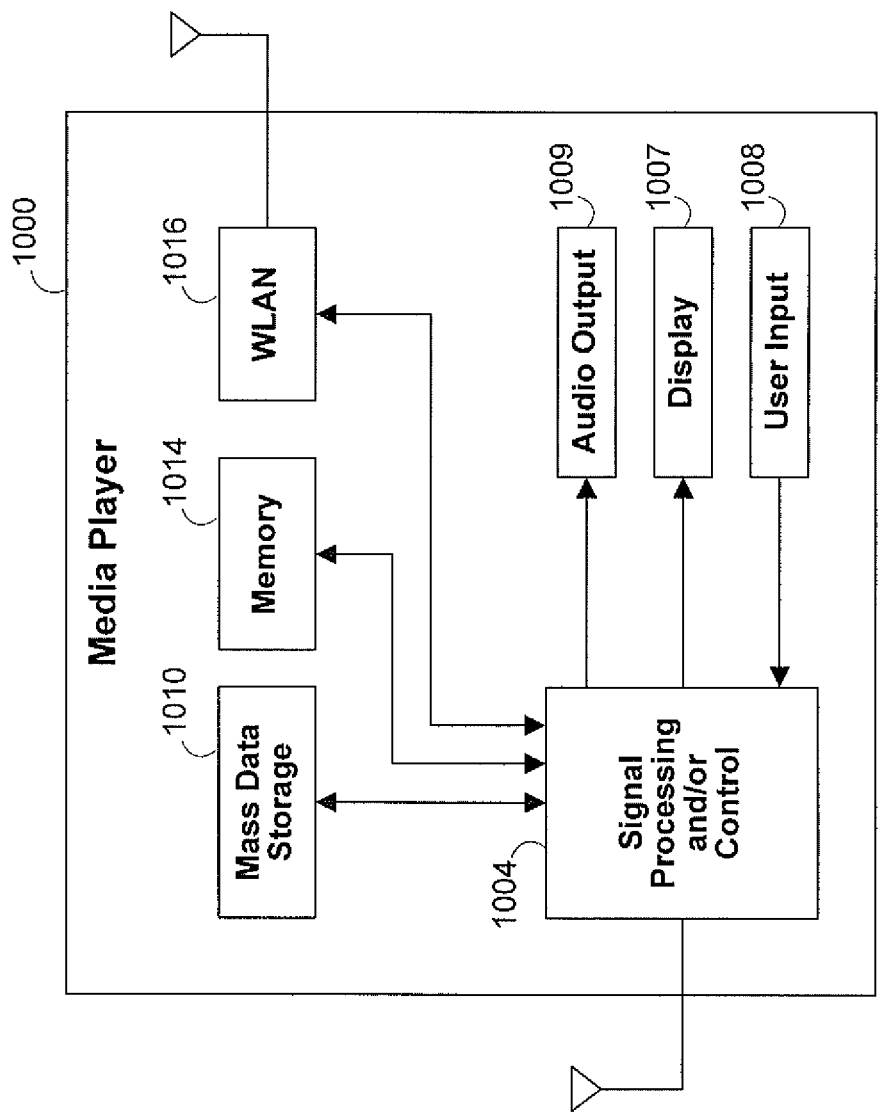
FIG. 9G is a block diagram of an exemplary media player that can employ the disclosed technology.

Referring now to FIG. 9G, the present invention can be implemented in a media player 1000. The present invention may implement either or both signal processing and/or control circuits, which are generally identified in FIG. 9G at 1004, a WLAN interface 1016 and/or mass data storage 1010 of the media player 1000. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, and/or perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 1000 may be connected to memory 1014 such as RAM, ROM, nonvolatile memory such as flash memory and/or other suitable electronic data storage. The media player 1000 also may support connections with a WLAN via a WLAN network interface 1016.

It is understood that the foregoing is only illustrative of the principles of the invention, and that the invention can be practiced by other than the described embodiments and aspects of the invention, which are presented for purposes of illustration and not of limitation, and the present invention is limited only by the claims which follow.

What is claimed is:

1. A method for detecting a symbol length of a received signal, the method comprising:
   detecting the symbol length of the received signal by correlating, using correlation circuitry, the received signal with a plurality of time-delayed versions of the received signal to output a plurality of correlated signals and a control signal identifying the detected symbol length, wherein the control signal is generated based on a weighted function of a first type of characteristic and a second type of characteristic of each of the plurality of correlated signal, and wherein the correlating comprises multiplying the received signal with the plurality of time-delayed versions of the received signal;
   receiving, with selection circuitry, the control signal and each one of the plurality of correlated signals; and
   selecting, using the selection circuitry, one of the received plurality of correlated signals based upon the received control signal.

2. The method of claim 1, further comprising detecting a guard interval length of the received signal by filtering the selected correlated signal.

3. The method of claim 1, wherein detecting the symbol length of the received signal comprises:
   determining the first type of characteristic and the second type of characteristic of each of the plurality of correlated signals; and
   comparing the determined first type of characteristic and the determined second type of characteristic of each one of the plurality of correlated signals with another one of the plurality of correlated signals.

4. The method of claim 3, wherein the first type of characteristic and the second type of characteristic comprise:
   ratios of peak to average amplitude of each of the plurality of correlated signals; and
   count values of the number of peaks of each of the plurality of correlated signals.

5. The method of claim 2, further comprising down-sampling the selected correlated signal before the detecting the guard interval length.

6. The method of claim 2, wherein filtering the selected correlated signal comprises using a plurality of filters to output a plurality of filtered correlated signals.

7. The method of claim 6, wherein detecting the guard interval length of the received signal comprises comparing the plurality of filtered correlated signals.

8. A method for detecting a symbol length of a received signal, the method comprising:
   detecting the symbol length of the received signal by correlating, using correlation circuitry, the received signal with first and second versions of the received signal to output respective first and second correlation signals and a control signal identifying the detected symbol length, wherein the control signal is generated based on a weighted function of a first type of characteristic and a second type of characteristic of the first and second correlation signals, and wherein the correlating comprises multiplying the received signal with the first and second versions of the received signal;
   receiving, with selection circuitry, the control signal and each one of the first and second correlation signals; and
   filtering, using filter circuitry, a selected one of the first and second correlation signals to create a plurality of filtered correlation signals, wherein the selected one of the first and second correlation signals is selected based upon the received control signal.

9. The method of claim 8, further comprising comparing the plurality of filtered correlation signals to detect a guard interval length of the received signal.

10. The method of claim 8, wherein the first and second versions of the received signal are delayed with respect to the received signal by a predetermined time interval.

11. The method of claim 8, wherein the received signal is correlated with the first and second versions of the received signal over a summation interval.

12. The method of claim 8, wherein detecting the symbol length of the received signal further comprises:
generating a set of characteristic data based on the first type of characteristic and the second type of characteristic of the first and second correlation signals; and
analyzing the generated set of characteristic data to detect the symbol length of the received signal.

13. The method of claim 12, wherein the set of characteristic data comprises:
ratios of peak to average amplitude of each of the first and second correlation signals; and
count values of the number of peaks of each of the first and second correlation signals.

14. The method of claim 13, wherein analyzing the generated set of characteristic data comprises choosing a symbol length which corresponds to a correlation signal that has the highest ratio of peak to average amplitude and the lowest count value of the number of peaks.

15. The method of claim 9, wherein comparing the plurality of filtered correlation signals comprises:
generating a set of characteristic data based on one or more characteristics of the plurality of filtered correlation signals; and
analyzing the generated set of characteristic data to detect the guard interval length of the received signal.

16. The method of claim 15, wherein the set of characteristic data comprises ratios of peak to average amplitude of each of the plurality of filtered correlation signals.

17. The method of claim 16, wherein analyzing the generated set of characteristic data comprises choosing a guard interval length which corresponds to a filtered correlation signal that has the highest ratio of peak to average amplitude.

18. A system for detecting a symbol length of a received signal, the system comprising:
a plurality of correlators, wherein each correlator is operable to correlate the received signal with a time-delayed version of the received signal to output a correlated signal, and wherein each correlator multiplies the received signal with the time-delayed version of the received signal;
first decision circuitry coupled to the plurality of correlators and operable to detect the symbol length from the correlated signals and output a control signal identifying the detected symbol length, wherein the control signal is generated based on a weighted function of a first type of characteristic and a second type of characteristic of each of the correlated signals; and
selector circuitry coupled to the plurality of correlators and operable to select one of the correlated signals received from the plurality of correlators based upon the received control signal.

19. The system of claim 18, further comprising:
a plurality of filters coupled to the selector circuitry and operable to filter the selected correlated signal to output a plurality of filtered correlated signals; and
second decision circuitry coupled to the plurality of filters and operable to detect a guard interval length from the plurality of filtered correlated signals.

20. The system of claim 18, further comprising decimator circuitry operable to down-sample the output of the selector circuitry.

21. The method of claim 1, wherein the control signal identifying the detected symbol length is generated based on ratios of peak to average amplitude of each of the plurality of correlated signals.

* * * * *